US010749982B2

(12) United States Patent
Keller et al.

(10) Patent No.: US 10,749,982 B2
(45) Date of Patent: Aug. 18, 2020

(54) MULTIPLE GEOGRAPHY SERVICE ROUTING

(71) Applicant: Citrix Systems, Inc., Fort Lauderdale, FL (US)

(72) Inventors: Steven A. Keller, Coral Springs, FL (US); Thomas J. Hammond, Coconut Creek, FL (US); Thomas Michael Kludy, Cooper City, FL (US); Ayush Jain, North Lauderdale, FL (US); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 252 days.

(21) Appl. No.: 15/875,424

(22) Filed: Jan. 19, 2018

(65) Prior Publication Data

US 2019/0230189 A1 Jul. 25, 2019

(51) Int. Cl.
*H04L 29/08* (2006.01)
*H04W 4/02* (2018.01)
*H04L 12/701* (2013.01)

(52) U.S. Cl.
CPC ............ *H04L 67/32* (2013.01); *H04L 45/00* (2013.01); *H04L 67/1021* (2013.01); *H04L 67/18* (2013.01); *H04L 67/2842* (2013.01); *H04L 67/327* (2013.01); *H04W 4/02* (2013.01)

(58) Field of Classification Search
CPC ..... H04L 67/32; H04L 67/1021; H04L 67/18; H04L 67/2842; H04L 67/327; H04N 21/25841; H04N 21/4524
See application file for complete search history.

(56) References Cited

U.S. PATENT DOCUMENTS

2016/0337264 A1* 11/2016 Murashko ............. H04L 47/827
2019/0098107 A1* 3/2019 Howard ............. H04L 67/2838

OTHER PUBLICATIONS

Danilo Sato, "CanaryRelease," Jun. 25, 2014, Martinfowler.com, pp. 1-5, https://martinfowlercom/bliki/CanaryRelease.html (accessed Oct. 30, 2017).
"Canary Testing," Feature Flags, Toggles, Controls, pp. 1-6, https://featureflags.io/canary-testing (accessed Nov. 8, 2017).
(Continued)

*Primary Examiner* — Mulugeta Mengesha
(74) *Attorney, Agent, or Firm* — Banner & Witcoff, Ltd.

(57) ABSTRACT

Methods and systems for routing a user request for a service to a version of the service in a geographical region associated with the user are described herein. The service may be deployed in multiple geographical regions, and the service may have multiple versions in each of the geographical regions. A user device may send a request for a service to a first server in a geographical region. The first server may determine whether the user is associated with the geographical region. Responsive to determining that the user is not associated with the geographical region, the first server may ask one or more servers in other geographical regions whether the user is associated with any of the other geographical regions.

20 Claims, 9 Drawing Sheets

(56) References Cited

OTHER PUBLICATIONS

Allan Leinwand, "3 Things Companies Must Know About Data Sovereignty When Moving to the Cloud," Feb. 20, 2017, The Enterprisers Project, pp. 1-6, https://enterprisersproject.com/article/2017/1/three-things-companies-must-know-about-data-sovereignty-when-moving-cloud (accessed Oct. 30, 2017).
"Global Server Load Balancing," Jan. 5, 2011, Eukhost, pp. 1-3, https://www.eukhost.com/kb/global-server-load-balancing (accessed Nov. 8, 2017).
Margaret Rouse, "What is data sovereignty?" WhatIs.com, pp. 1-4, http://whatis.techtarget.com/definition/data-sovereignty (accessed Jan. 22, 2018).
"How GSLB Works," May 24, 2017, Citrix Product Documentation, pp. 1-3, https://docs.citrix.com/en-us/netscaler/11-1/gslb/how-gslb-works.html (accessed Jan. 22, 2018).
Contributors, "Overview of Traffic Manager," Jun. 15, 2017, Microsoft Docs, pp. 1-5, https://docs.microsoft.com/en-us/azure/traffic-manager/traffic-manager-overview (accessed Nov. 8, 2017).
Allan Leinwand, "Is Data Sovereignty a Barrier to Cloud Adoption?" Apr. 11, 2017, Forbes Community Voice, pp. 1-3, https://www.forbes.com/sites/forbestechcouncil/2017/04/11/is-data-sovereignty-a-barrier-to-cloud-adoption/#6c4d93df1c82 (accessed Oct. 30, 2017).
"Data Sovereignty," r&g technologies, pp. 1-4, http://rgtechnologies.com.au/resources/data-sovereignty (accessed Oct. 30, 2017).

\* cited by examiner

MULTIPLE GEOGRAPHY SERVICE ROUTING

FIELD

Aspects described herein generally relate to computer and network hardware and software. In particular, the present disclosure relates to methods and systems for routing user requests for services among multiple versions of the service in a multiple geography environment.

BACKGROUND

Enterprises are increasingly adopting cloud computing services, as well as new approaches to data storage including object storage, in order to take advantage of the benefits of not having to purchase and manage the systems and applications. Cloud computing services have broken down traditional geographical barriers, as the cloud computing services can be running on cloud computing servers distributed in multiple geographical regions around the world. User data may be stored in any of the cloud computing servers. Storing user data in multiple geographical regions may make the user data vulnerable to subpoena, theft, or appropriation in the geographical regions in which the user data is stored. Additionally, data sovereignty laws may require a user's data to be physically stored only in the geographical region in which the user resides.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Examples described herein are directed towards a system, an apparatus, and/or computer readable media configured to perform a method for routing a user request for a service among multiple versions of the service in a multiple geography environment. The method may include receiving, by a first server of a plurality of servers and from a user device, a request for a service comprising a plurality of different versions of the service. The first server may be located in a first geographical region. The first server may determining whether a user of the user device is associated with the first geographical region. Responsive to determining that the user is not associated with the first geographical region, the first server may send to a second server of the plurality of servers a request to determine whether the user is associated with a second geographical region different from the first geographical region. The second server may be located in the second geographical region. The first server may receive from the second server a response indicating that the user is associated with the second geographical region. The response may comprise routing information for the request for the service. The routing information may indicate a version of the service of the plurality of different versions of the service. Based on the routing information, the first server may route the request for the service.

In some examples, the first server may receive from the second server of the plurality of servers a request to determine whether a second user is associated with the first geographical region. Responsive to determining that the second user is associated with the first geographical region, the first server may send to the second server of the plurality of servers a second response indicating that the second user is associated with the first geographical region.

In some examples, the first server may receive from a second user device a second request for the service, determine whether a second user of the second user device is associated with the first geographical region, and, responsive to determining that the second user is associated with the first geographical region, determine a version of the service to send the second request.

In some examples, the first server may store the routing information in a cache of the first server. The first server may receive a second request for the service, determine whether the cache stores information configured to route the second request for the service, and, responsive to determining that the cache stores the information configured to route the second request for the service, send the second request for the service based on the information.

In some examples, a destination URL of the request for the service does not indicate the first geographical region or the second geographical region, and the receiving the request for the service includes receiving the request for the service via a traffic manager. In some examples, the determining whether the user is associated with the first geographical region includes determining whether the user is allowed to send data to the first geographical region under data sovereignty laws. In some examples, the routing information is configured to direct the request for the service to a version of the service in the first geographical region or in the second geographical region.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various examples, reference is made to the accompanying drawings identified above and which form a part hereof, and in which is shown by way of illustration various examples in which aspects described herein may be practiced. It is to be understood that other examples may be utilized and structural and functional modifications may be made without departing from the scope described herein. Various aspects are capable of other examples and of being practiced or being carried out in various different ways.

As a general introduction to the subject matter described in more detail below, aspects described herein are directed towards routing a user's request for a service to a service server running a version of the service. The service may be deployed in multiple geographical regions. The user may use a single Domain Name System (DNS) name to access the service in a particular geographical region with the help of a traffic manager. Because of privacy or security concerns or data sovereignty laws, the user may be limited to accessing the service in one geographical region (e.g., the geographical region where the user resides). As such, a service router in each geographical region may determine whether the user is allowed to access the service in that geographical region. If the user is not allowed to access the service in that geographical region, the service router may ask the service routers in the other geographical regions to determine whether the user is allowed to access the service in one of the other geographical regions.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
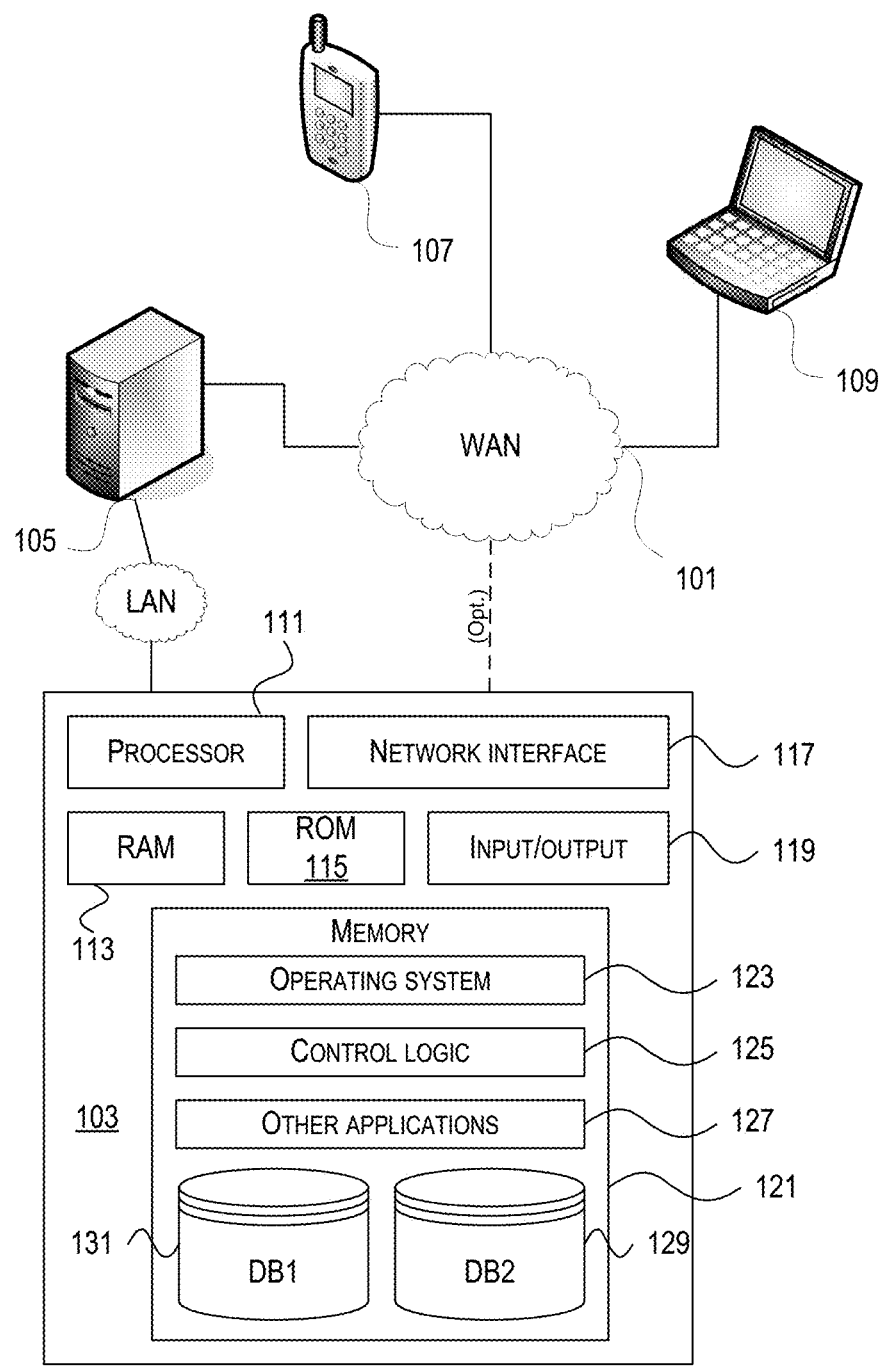
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some examples, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. The functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
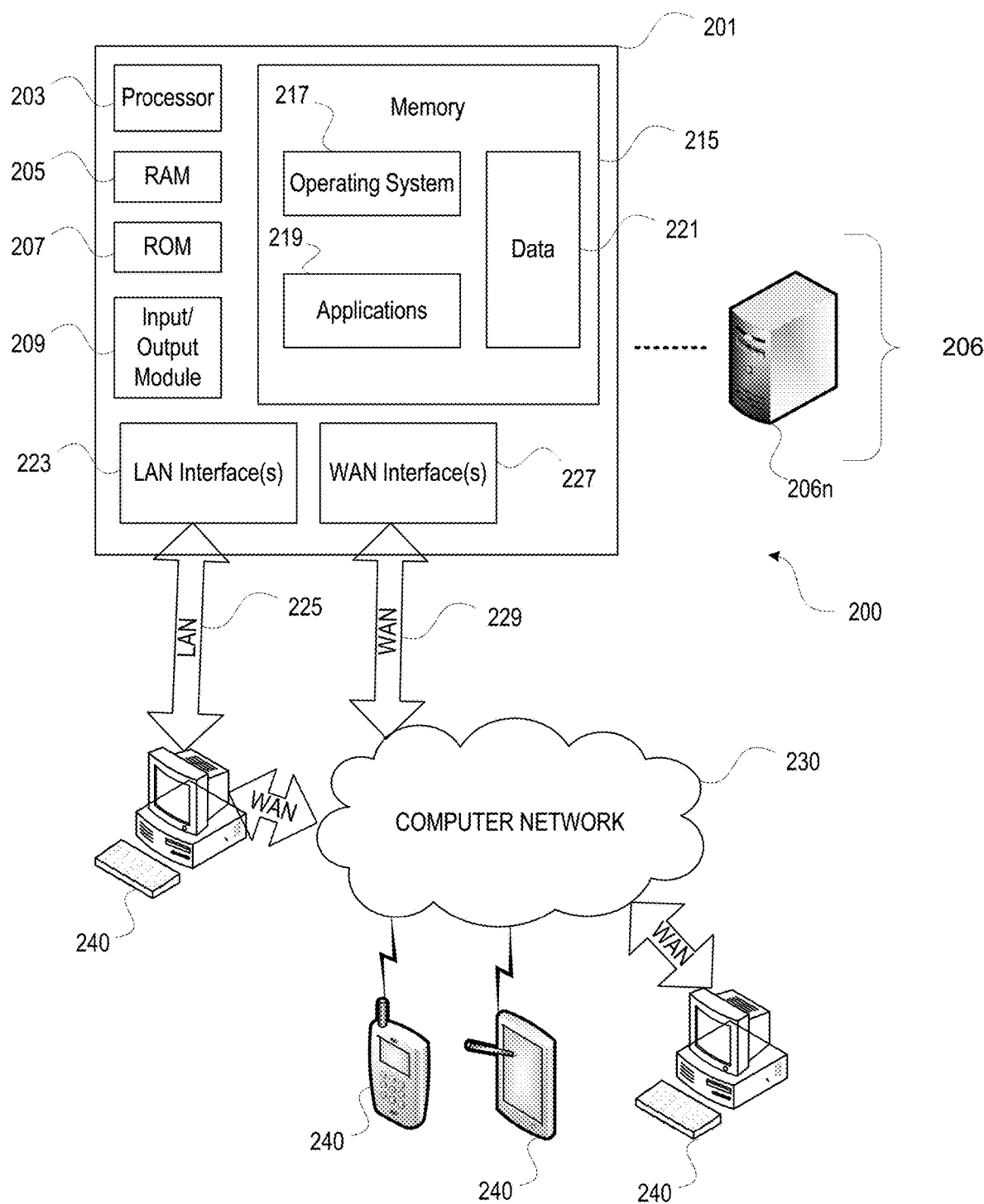
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). The network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one example, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some examples be referred to as a single client machine 240 or a single group of client machines 240, while server(s) 206 may be referred to as a single server 206 or a single group of servers 206. In one example a single client machine 240 communicates with more than one server 206, while in another example a single server 206 communicates with more than one client machine 240. In yet another example, a single client machine 240 communicates with a single server 206.

A client machine 240 can, in some examples, be referenced by any one of the following non-exhaustive terms: client machine(s); client(s); client computer(s); client device(s); client computing device(s); local machine; remote machine; client node(s); endpoint(s); or endpoint node(s). The server 206, in some examples, may be referenced by any one of the following non-exhaustive terms: server(s), local machine; remote machine; server farm(s), or host computing device(s).

In one example, the client machine 240 may be a virtual machine (and/or a domain). The virtual machine may be any virtual machine, while in some examples the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some examples include a client device 240 that displays application output generated by an application remotely executing on a server 206 or other remotely located machine. In these examples, the client device 240 may execute a virtual machine receiving program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some examples, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some examples, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some examples the server farm 206 may be administered as a single entity, while in other examples the server farm 206 can include multiple server farms.

In some examples, a server farm may include servers 206 that execute a substantially similar type of operating system platform (e.g., WINDOWS, UNIX, LINUX, iOS, ANDROID, SYMBIAN, etc.) In other examples, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some examples include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Multiple Geography Service Routing

Figure 3:
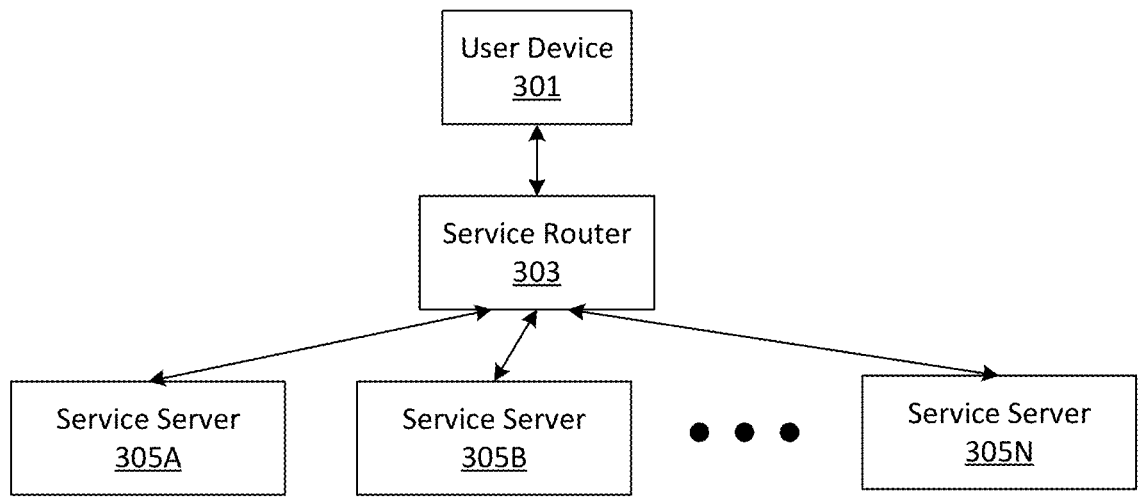
FIG. 3 depicts an illustrative example of a system for routing a request for a service to a version of the service.

FIG. 3 depicts an illustrative example of a system for routing a request for a service to a version of the service. The system may include a user device 301, a service router 303, and one or more service servers 305A-305N. The user device 301 may communicate with the service servers 305A-305N using the service router 303. The user device 301 may comprise an end point device, client computers 107, 109, terminals 240, mobile devices, or any other device. The mobile devices may be a smartphone, a tablet, and the like. One or more applications may be running on the user device 301. The service router 303 may comprise a server (e.g., servers 201, 206), computing device, or any other device configured to perform the functions disclosed herein. For example, the service router 303 may be a canary server.

The service servers 305A-305N may be a server (e.g., servers 201, 206), computing device, or any other device. A service may be running on each of the service servers 305A-305N. The service may be a cloud service, an email service, a storage service, or other types of services. The service may have multiple versions, and each version of the service may be running on a different service server of the service servers 305A-305N.

For example, the service server 305A may implement a stable version of the service, which most of the users may use. The stable version may have few technical problems that need to be debugged or undesirable features that the users do not like. On the other hand, the service server 305B may implement a new version of the service, with new features added. The new version may have potential technical problems or undesirable features that may emerge as the new version is rolling out to the users.

The illustrative system shown in FIG. 3 may be used to roll out the new version of the service smoothly, with minimum disturbance to the users. The system may reduce the risk of introducing a new software version by slowly rolling out the change to a small subset of the users before rolling it out to the entire set of the users. If problems with respect to the new version are identified while the small subset of the users are using the new version, the system may switch the small subset of the users back to the stable version until the problems are fixed. If no problem is identified, the system may increase the number of users whose requests for the service are routed to the new version, until all the users are switched to the new version.

The user device 301 may send a request for the service to the service router 303. Responsive to receiving the request for the service, the service router 303 may determine to which service server of the service servers 305A-305N the request for the service is to be routed. This determination may be made based on different rules of the service router 303.

For example, a random sample may be used to choose the users who will be switched to the new version. In another example, the new version may be first released to the service provider's internal users and employees. In yet another example, the users may be chosen based on their profile and demographics. Other rules may also be used. Based on the determination of the service router 303, the request for the service may be routed to the chosen service server of the service servers 305A-305N.

Figure 4:
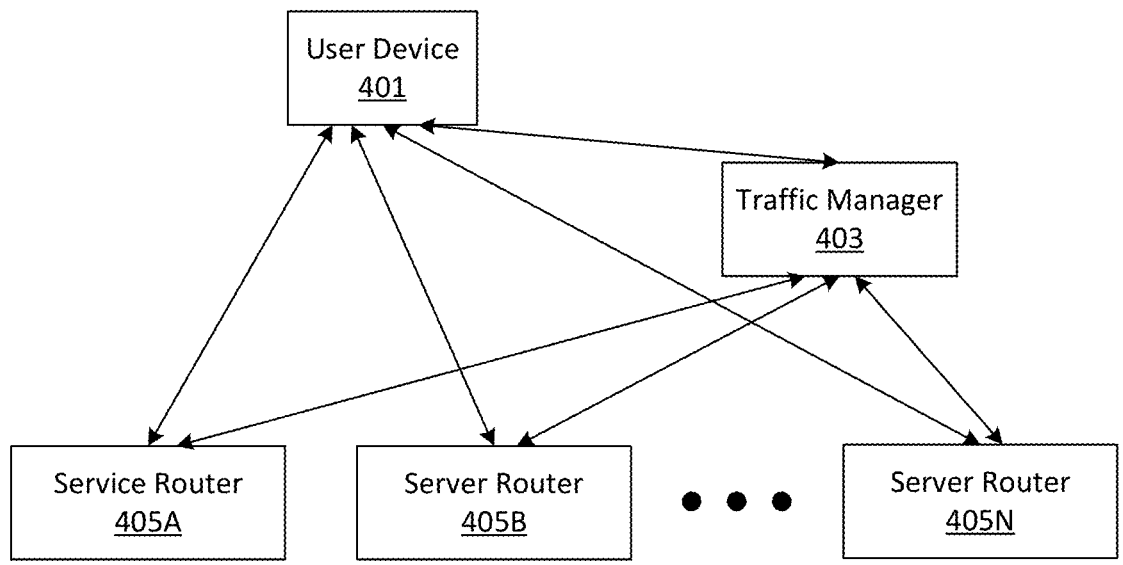
FIG. 4 depicts an illustrative example of a system for routing a request for a service to a service router of one or more service routers located in different geographical regions.

FIG. 4 depicts an illustrative example of a system for routing a request for a service to a service router of one or more service routers located in different geographical regions. The system may include a user device 401, a traffic manager 403, one or more service routers 405A-405N, and one or more service servers (not illustrated). The user device 401 may directly communicate with the service routers 405A-405N, and/or may communicate with the service routers via the traffic manager 403. The traffic manager 403 may communicate with user device 401, and may communicate with the service routers 405A-405N.

The service routers 405A-405N may be physically located in different geographical regions. For example, the service router 405A may be physically located in the United States, the service router 405B may be physically located in Germany, and the other service routers may be physically located in other countries, such as Canada, Japan, South Korea, China, and so on. In another example, the service routers 405A-405N may be located in different subnational regions, such as the northeastern United States, the midwestern United States, the southern United States, or the western United States. In yet another example, the service routers 405A-405B may be located in different states, provinces, etc. of a federal government, such as the different states of the United States.

Each of the service routers 405A-405N may have a registered DNS name that points to each of the service routers 405A-405N. For example, a DNS name service-405A.serviceprovider.net may point to the service router 405A, a DNS name service-405B.serviceprovider.net may point to the service router 405B, and so on. Because the service routers 405A-405N may be distributed in different geographical regions, their DNS names may be based on their geographical regions. For example, a DNS name service-US.serviceprovider.net may point to the service router 405A if the service router 405A is located in the United States, a DNS name service-EU.serviceprovider.net may point to the service router 405B if the service router 405B is located in Europe, and so on.

The service itself may have a registered DNS name (e.g., a single registered DNS name) For example, the DNS name may be service.serviceprovider.net. A user can use the DNS name to access the service without specifying the specific geographical region or service router. The traffic manager 403 may direct the user's request for the service to one of the geographical regions. For example, the DNS name may point to the traffic manager 403. The traffic manager 403 may translate or resolve the DNS name into a DNS name or network address of the service in one particular geographical region.

The service routers 405A-405N may be configured to perform one or more of the same functions as the service router 303. For example, in each of the geographical regions, there may be one or more service servers implementing different versions of the service, and those service servers may interact with the service router located in the same geographical region according to the methods discussed with reference to FIG. 3. Upon receiving a request for a service, a service router of the service routers 405A-405N may choose a service version to which to route the request. In addition, the service routers 405A-405N may be configured to perform one or more functions as discussed below.

In one example, a user may cause the user device 401 to communicate directly with the service routers 405A-405N by specifying the DNS name of the service router that the user intends to access. For example, the user may enter service-US.serviceprovider.net to access a service router in the United States and subsequently a version of the service in the United States. In this example, the user may need to know the geographical region to which the user intends to send the request for the service.

In another example, a user may cause the user device 401 to communicate with the service routers 405A-405N using the traffic manager 403. In such examples, the user might not specify the service router or the geographical region to which the user intends to send the request for the service. Rather, the user may enter the single DNS name associated with the service (e.g., service.serviceprovider.net). The single DNS name may point to the traffic manager 403, and the traffic manager 403 may direct the user's request for the service to a particular geographical region and/or the service router therein.

For example, a service may have a global DNS name. The user may enter into the user device 401 a URL comprising the global DNS name to request the service. The global DNS name may point to the traffic manager 403. Based on the global DNS name, the user device 401 may inform the traffic manager 403 that the user device intends to access the service. The traffic manager 403 may choose a service router of the service routers 405A-405N to which to send the user request. Then the traffic manager 403 may return, to the user device 401, the DNS name or other network address of the chosen service router. The user device 401 may send the request for the service to the chosen service router based on the returned DNS name or other network address.

The traffic manager 403 may choose the service router to which to send the user's request for the service according to its own rules. For example, the traffic manager 403 may choose the service router that is geographically nearest the user device 401. The traffic manager 403 may maintain a list of locations corresponding to the service routers, or otherwise determine the location of the service routers. The traffic manager 403 may gather information regarding the location of the user device 401 (e.g. by asking the user device 401 to send its Global Positioning System or other location information to the traffic manager 403). Based on the location of the service routers and the location of the user device, the traffic manager 403 may determine the service router that is geographically nearest the user device 401.

In another example, the traffic manager 403 may monitor the health of each of the service routers 405A-405N, such as their current load, input/output utilization, storage space usage, responsiveness to requests, and/or the conditions of the hardware (e.g., temperature of the central processing unit, power supply conditions, etc.). The traffic manager 403 may choose the most healthy service router to which to send the user's request for the service. Additionally or alternatively, the traffic manager 403 may choose the service router based on other methods.

The traffic manager 403 may comprise a server configured to perform one or more of the functions discussed herein. The traffic manager 403 may be a DNS name server, or a server associated with the DNS name server. The traffic manager 403 may be a Global Server Load Balancing (GSLB) server.

In other examples, the user device 401 may send the request for the service to the traffic manager 403. The traffic manager 403 may receive the request for the service and route the request for the service to one of the service routers 405A-405N.

When the user requests a service using, for example, a DNS name that does not specify the geographical region to which the user intends to send the request, the service router 405A-405N that receives the request for the service might not know the geographical region that the user intended to access. The service router 405A-405N might only know that the user intended to access the service.

Because the service routers 405A-405N may be located in different geographical regions, and the service may be running in different geographical regions, it might be advantageous for the system to send the user's request for the service to the geographical region in which the user resides. For example, data sovereignty laws of a geographical region may prohibit the residents of the geographical region from sending data physically outside the geographical region. In another example, a user may want to store data in or send data to only the geographical region in which the user resides because of privacy and/or security concerns. Sending data to or storing data outside of the geographical region of the user's residence may make the data vulnerable to subpoena, theft, or destruction in the other geographical regions.

Figure 5:
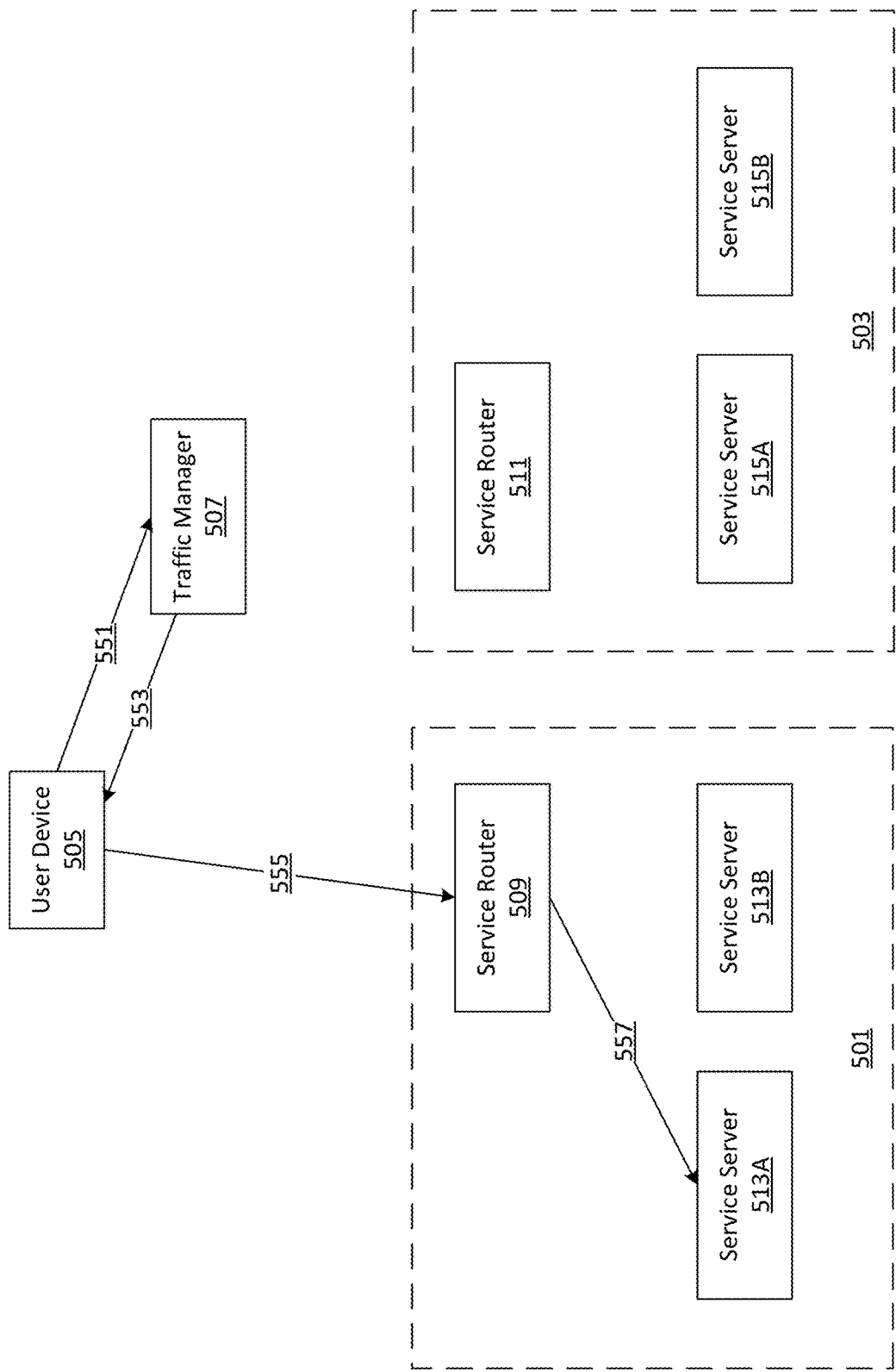
FIG. 5 depicts an illustrative example of a system and method for routing a request for a service to a version of the service in a geographical region.

FIG. 5 depicts an illustrative example of a system and method for routing a request for a service to a version of the service in a geographical region. The system may include a first geographical region 501, a second geographical region 503, a user device 505, a traffic manager 507, one or more service routers (e.g., service routers 509, 511), and one or more service servers (e.g., service servers 513A, 513B, 515A, 515B). The service router 509 and the service servers 513A, 513B may be physically located in the first geographical region 501. The service router 511 and the service servers 515A, 515B may be physically located in the second geographical region 503. The elements are illustrative only, and it can be appreciated that there may be more or less than two geographical regions, more or less than two service routers, and/or more or less than two service servers in each geographical region.

A user may be a resident of the first geographical region 501, and the user may be using the user device 505 in the first geographical region. The user may enter a single DNS name to request the service. The single DNS name may point to the traffic manager 507. In step 551, the user device 505 may send a request for the traffic manager 507 to resolve the single DNS name. The traffic manager 507 may choose the service router 509 to which to redirect the request for the service. In step 553, the traffic manager 507 may return the DNS name or other network address of the chosen service router 509. In step 555, the user device 505 may send the request for the service to the service router 509 based on the returned DNS name or other network address, and the service router 509 may receive the request for the service.

Additionally or alternatively, the user device 505 may send the request for the service to the traffic manager 507. The traffic manager 507 may receive the request for the service and route the request for the service to the service router 509. The traffic manager 507 may route the request for the service to the service router 509 based on the DNS name or other network address, and the service router 509 may receive the request for the service.

The service router 509 may parse the URL of the request for the service and process the context of the request to determine the service that the user is requesting and/or the identity of the user. If the service router 509 determines that the service that the user is requesting is not available, the service router 509 may send a notice of failure to the user device 505.

The service router 509 may determine that the service that the user is requesting is available in the first geographical region 501, and that the user is allowed to send data to the first geographical region 501 under data sovereignty laws or privacy and security concerns. The service router 509 may choose the version of the service running on service server 513A, and send the request for the service to the service server 513A.

Figure 6:
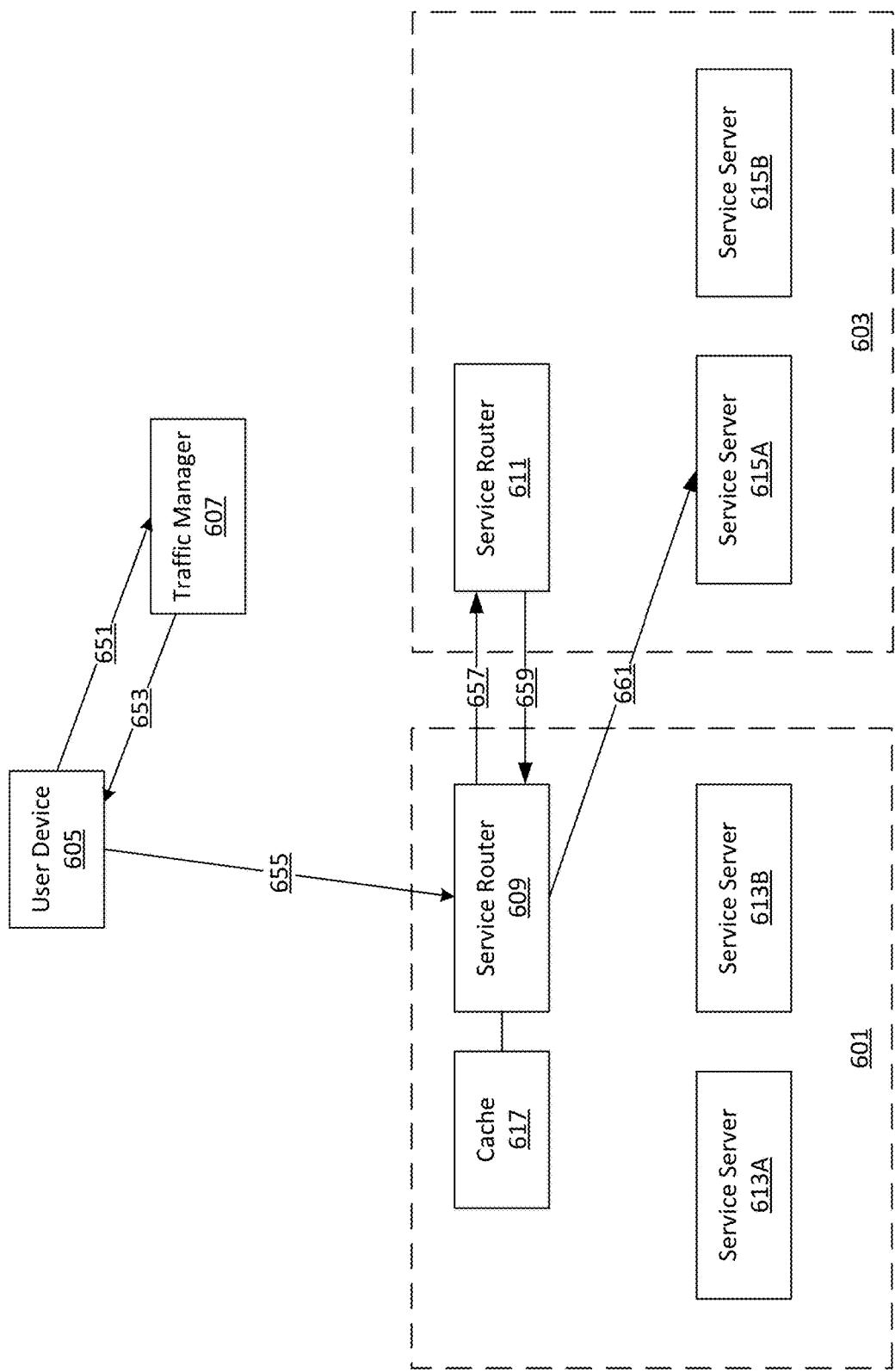
FIG. 6 depicts an illustrative example of a system and method for routing a request for a service to a version of the service.

FIG. 6 depicts an illustrative example of a system and method for routing a request for a service to a version of the service. The system may include a first geographical region 601, a second geographical region 603, a user device 605, a traffic manager 607, one or more service routers (e.g., service routers 609, 611), and one or more service servers (e.g., service servers 613A, 613B, 615A, 615B). The service router 609 and the service servers 613A, 613B may be physically located in the first geographical region 601. The service router 611 and the service servers 615A, 615B may be physically located in the second geographical region 603. The elements are illustrative only, and it can be appreciated that there may be more or less than two geographical regions, more or less than two service routers, and more or less than two service servers in each geographical region.

A user may be a resident of the second geographical region 603, and the user may be using the user device 605 in the first geographical region 601. For example, the user may be on a business trip in the first geographical region 601. The user may enter a single DNS name to request the service. The single DNS name may point to the traffic manager 607. In step 651, the user device 605 may send a request for the traffic manager 607 to resolve the single DNS name. The traffic manager 607 may choose the service router 609 to which to redirect the equest for the service. In step 653, the traffic manager 607 may return the DNS name or other network address of the chosen service router 609. In step 655, the user device 605 may send the request for the service to service router 609 based on the returned DNS name or other network address, and the service router 609 may receive the request for the service.

Additionally or alternatively, the user device 605 may send the request for the service to the traffic manager 607. The traffic manager 607 may receive the request for the service and route the request for the service to the service router 609. The traffic manager 607 may route the request for the service to the service router 609 based on the DNS name or other network address, and the service router 609 may receive the request for the service.

The service router 609 may parse the URL of the request for the service and process the context of the request to determine the service that the user is requesting and/or the identity of the user. The service router 609 may determine that the service that the user is requesting is available in the first geographical region 601, the user is not associated with (e.g., not a resident of) the first geographical region 601, and/or that the user did not specify the user's intention about the geographical region to send the request for the service. For example, the user may have entered a DNS name that did not indicate a geographical region.

Upon making these determinations, the service router 609 may attempt to determine whether the user may be associated with other geographical regions. The service router 609 may maintain a list of service routers that are cooperating with the service router 609 in determining a particular user's association with any of the service routers. The service router may send requests to one or more of the service routers on the list. In step 657, the service router 609 may send, to the service router 611, a request to determine if the user is associated with the second geographical region 603. The service router 611 may determine that the user is associated with the second geographical region 603 (e.g., is a resident of the second geographical region 603), and chooses the service server 615A in the second geographical region 603 as the destination to which to send the user's request for the service. In step 659, the service router 611 may send a response to the service router 609. The response may indicate that the user is associated with the second geographical region 603, and specify the DNS name or other network address of the service server 615A. In step 661, the service router 609 may send the request for the service to the service server 615A.

The service router 609 may include or communicate with a cache 617, which may be configured to store the response received from the service router 611, including the routing information. The information stored in the cache 617 can be used the next time the service router 609 receives a request for the service from the user of the user device 605. In that case, the service router 609 may check the cache 617 to determine if there is routing information associated with the user, before the service router 609 sends the request to the other service router 611 (e.g., in step 657). If routing information associated with the user is found in the cache 617, the service router 609 may route the user's request for the service based on the routing information in the cache 617 (e.g., without asking the service router 611 for that information).

Figure 7:
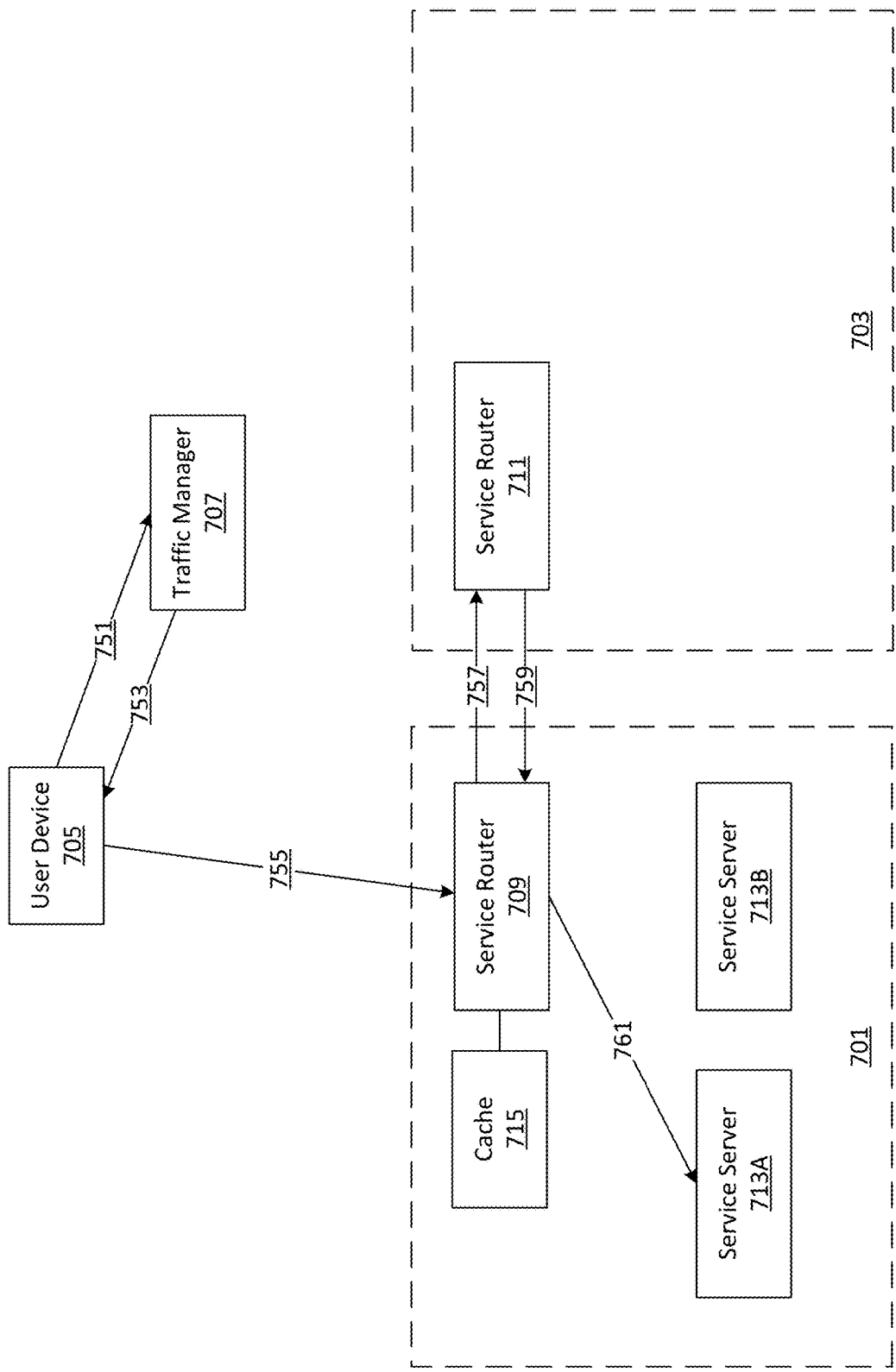
FIG. 7 depicts an illustrative example of a system and method for routing a request for a service where the service is available in a geographical region.

FIG. 7 depicts an illustrative example of a system and method for routing a request for a service where the service is available in a geographical region. The system may include a first geographical region 701, a second geographical region 703, a user device 705, a traffic manager 707, one or more service routers (e.g., service routers 709, 711), and one or more service servers (e.g., service servers 713A, 713B). The service router 709 and the service servers 713A, 713B may be physically located in the first geographical region 701. The service router 711 may be physically located in the second geographical region 703. There might not be a service server running the service in the second geographical region 703. The service might only be available in the first geographical region 701 (or other geographical regions). The elements are illustrative only, and it can be appreciated that the service may be available in only one geographical region, in two or three geographical regions, and so on.

A user may be a resident of the second geographical region 703, and the user may be using the user device 705 in the first geographical region 701. For example, the user may be on a business trip in the first geographical region.

The user may enter a single DNS name to request the service. The single DNS name may point to the traffic manager 707. In step 751, the user device 705 may ask the traffic manager 707 to resolve the single DNS name. The traffic manager 707 may choose the service router 709 to which to redirect the request for the service. In step 753, the traffic manager 707 may return the DNS name or other network address of the chosen service router 709. In step 755, the user device 705 may send the request for the service to the service router 709 based on the returned DNS name or other network address, and the service router 709 may receive the request for the service.

Additionally or alternatively, the user device 705 may send the request for the service to the traffic manager 707. The traffic manager 707 may receive the request for the service and route the request for the service to the service router 709. The traffic manager 707 may route the request for the service to the service router 709 based on the DNS name or other network address, and the service router 709 may receive the request for the service.

The service router 709 may parse the URL of the request for the service and process the context of the request to determine the service that the user is requesting and the identity of the user. The service router 709 may determine that the service that the user is requesting is available in the first geographical region 701, the user is not associated with the first geographical region 701 (e.g., is not a resident of the first geographical region 701), and/or the user did not specify the user's intention about the geographical region to send the request for the service (e.g., the user entered a DNS name that did not indicate a geographical region).

In step 757, the service router 709 may send, to the service router 711, a request to determine if the user is associated with the second geographical region 703. The service router 711 may determine that the user is associated with the second geographical region 703, but that the service is not available in the second geographical region 703. The service router 711 may have, in its service table, references to the services that are available, including a reference to the service in the first geographical region 701. The service router 711 may send a response to the service router 709. The response may indicate that the user is associated with the second geographical region 703, and specify the DNS name or other network address of a version of the service chosen, in this example, the service server 713A. In step 761, the service router 709 may send the request for the service to the service server 713A.

The service router 709 may include or communicate with a cache 715. The cache 715 may store the response received from the service router 711, including the information for routing the request for the service. The next time the service router 709 receives another request for the service from the user of the user device 705, the service router 709 might not have to ask the service router 711 for the routing information, and instead the service router 709 may send the request for the service to an appropriate service server based on the information stored in the cache 715.

Figure 8:
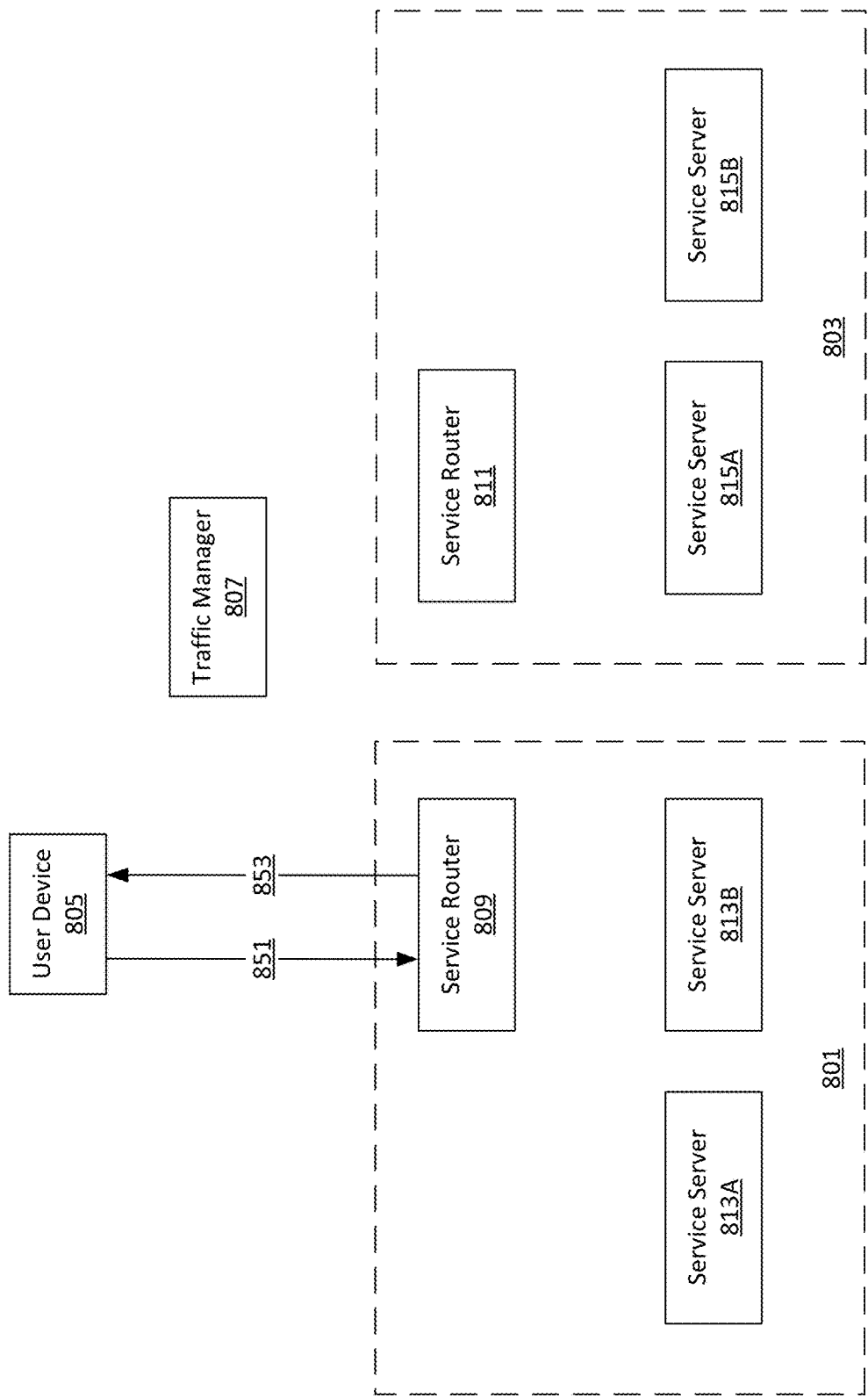
FIG. 8 depicts an illustrative example of a system and method for routing a request for a service where the user provides an indication of a specific geographical region.

FIG. 8 depicts an illustrative example of a system and method for routing a request for a service where the user provides an indication of a specific geographical region. The system may include a first geographical region 801, a second geographical region 803, a user device 805, a traffic manager 807, one or more service routers (e.g., service routers 809, 811), and one or more service servers (e.g., service servers 813A, 813B, 815A, 815B). The service router 809 and the service servers 813A, 813B may be physically located in the first geographical region 801. The service router 811 and the service servers 815A, 815B may be physically located in the second geographical region 803. The elements are illustrative only.

In this example, a user may be a resident of the second geographical region 803, and the user may be using the user device 805 in the first geographical region 801. For example, the user may be on a business trip in the first geographical region. The user may intend to send a request for a service to a specific geographical region by, for example, entering a geographically specific DNS name or other network address that points to the service router 809 located in the first geographical region 801. In step 851, the user device 805 may send a request for the service to the service router 809 directly without asking the traffic manager 807. After receiving the request for the service, the service router 809 may determine whether the user is associated with the first geographical region 801.

The service router 809 may determine that the user is not associated with the first geographical region 801. In this example, the service router 809 might not send a request to the other service router 811 or other service routers to determine whether the user is associated with the second geographical region 803 because the user may intend to access the service in the first geographical region 801, but might not be associated with the first geographical region 801. Upon the determination that the user is not associated with the first geographical region 801, the service router 809 may send a message of failure to the user device 805 in step 853.

Figure 9:
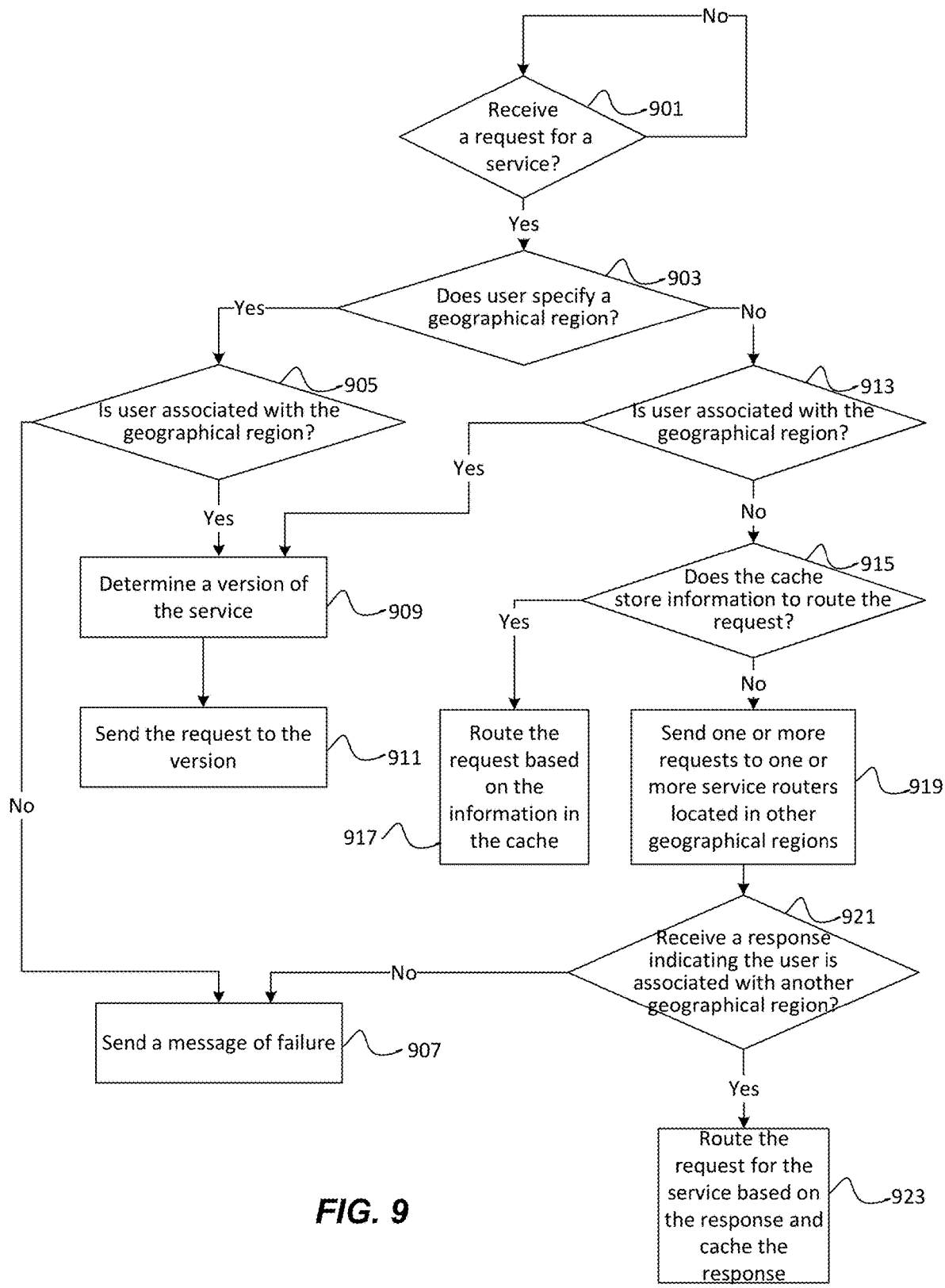
FIG. 9 depicts an illustrative example of a method for routing a request for a service in a multiple geography environment.

FIG. 9 depicts an illustrative example of a method for routing a request for a service in a multiple geography environment. One or more steps of the method may be performed by a service router that receives a request for a service. The method may begin with step 901, where the service router determines whether it has received a request for a service, such as from a user device. If the determination is no, the service router may keep listening to incoming traffic. If the determination is yes, the method may proceed to step 903.

In step 903, the service router may determine whether the user specifies a geographical region to which to send the request for the service. For example, the service router may determine whether the URL or other identifier entered by the user contains geographical information or a DNS name that points to the service router. This determination may allow the service router to ascertain whether the user intended to request a service in the specific geographical region or the user merely intended to request the service regardless of the geographical region. If the determination is yes, then the method may proceed to step 905. Otherwise, the method may proceed to step 913.

In step 905, the service router may determine whether the user is associated with the geographical region in which the service router is located (or otherwise associated with). For example, the service router may determine that the user is associated with the geographical region if the user is allowed to request data from or send data to the geographical region under the geographical region's data sovereignty laws. The service router may maintain a list of users who are allowed to request data from or send data to the geographical region under data sovereignty laws and then look up the user against the list of users to see if there is a match. For example, a user may be deemed to be allowed to request data from or send data to the geographical region if the user is a resident or citizen of the geographical region. In one example, the list of users may include many (e.g. all) the users that reside in and/or are citizens of the geographical region in which the service router is located.

In another example, the service router may determine that the user is associated with the geographical region if the user wants its data be physically stored in the geographical region for privacy and security concerns. Storing the user's data in one geographical region may prevent the user's data from being stolen or obtained by others while being stored in another geographical region.

In step 905, if the determination is no, the service router may, in step 907, send a message of failure to the user device, indicating that the user device is not permitted to access the service because the user is not associated with the geographical region. In step 905, if the determination is yes, the method may proceed to step 909, where the service router may determine a version of the service to which to send the user's request for the service. In step 911, the service router may send the user's request for the service to the chosen version of the service.

In step 913, the service router may perform a same or similar determination as in step 905 (e.g., whether the user is associated with the geographical region). If the determination in step 913 is yes, then the method may proceed to steps 909 and/or 911, as previously described. If the determination in step 913 is no, then the method may proceed to step 915, where the service router may determine whether the cache stores information configured to route the request for the service. For example, the cache may maintain a database storing routing data. The routing data may include one or more user's identities, one or more services, and one or more corresponding versions of the services in one or more geographical regions. The service router may look up the identity of the user and the service the user requested against the database to determine if there is any corresponding version of the service in a specific geographical region to which the user's request for the service may be routed. If the determination is yes, the method may proceed to step 917, where the service router sends the request for the service based on the information stored in the cache. If the determination is no, the method may proceed to step 919.

In step 919, the service router may send one or more requests to one or more service routers that are located in one or more other geographical regions. The one or more requests may ask the other service routers whether the user is associated with the other geographical regions. After receiving the requests, the other service routers may perform one or more steps of a method as discussed below with reference to FIG. 10.

In step 921, the service router may determine whether it has received a response from one of the other service routers indicating that the user is associated with one of the other geographical regions. If the determination is no, the service router may send a message of failure to the user device in step 907. If the determination is yes, the service router may, in step 923, route the user's request for the service based on the response received. The response may include routing information, such as the DNS name or other network address of the service server that runs a version of the service in one of the other geographical regions. The service router may recreate the transaction and send the request for the service to the DNS name or network address. In step 923, the service router may also store the routing information in a cache, which may be used later to route subsequent requests for the service.

Figure 10:
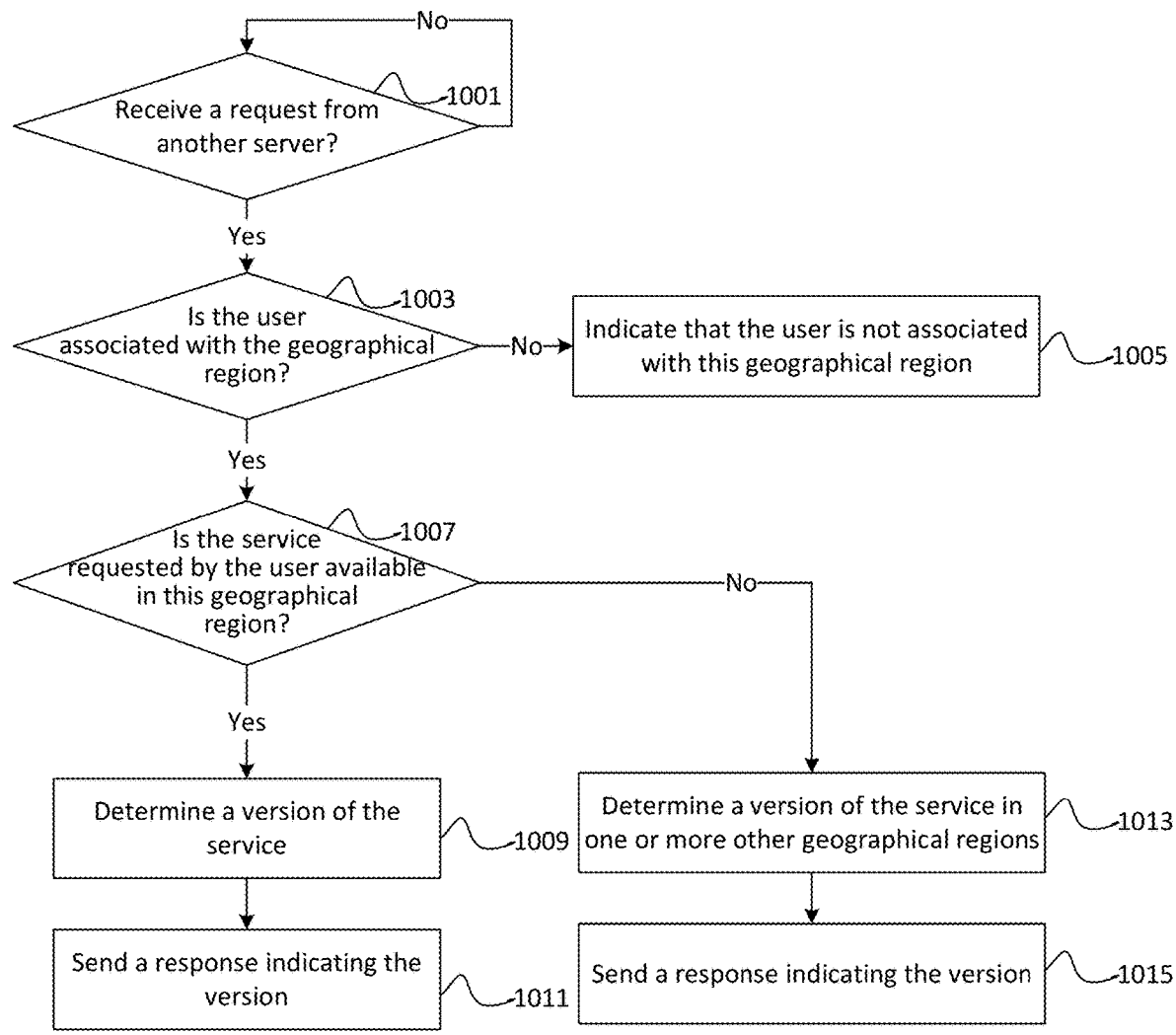
FIG. 10 depicts an illustrative example of a method for processing a request from a first geographical region to determine whether the user is associated with a second geographical region.

FIG. 10 depicts an illustrative example of a method for processing a request from a first geographical region to determine whether the user is associated with a second geographical region. One or more steps of the method may be performed by a second service router located in or otherwise associated with the second geographical region.

The method may start with step 1001, where the second service router may determine whether it has received a request from the first service router to determine whether the user is associated with the second geographical region. If the determination is no, then the second service router may continue to listen to incoming traffic. If the determination is yes, then the second service router may proceed to step 1003.

In step 1003, the second service router may determine whether the user is associated with the second geographical region. If the determination is no, then the second service router may transmit an indication to the first service router that the user is not associated with the second geographical region. If the determination is yes, then the second service router may proceed to step 1007.

In step 1007, the second service router may determine whether the service requested by the user is available in the second geographical region. In some examples, the service requested by the user may be available only in a few geographical regions. In some other examples, the service requested by the user may be available only in one geographical region. If the determination in step 1007 is yes, then the second service router may, in step 1009, choose a version of the service in the second geographical region. In step 1011, the second service router may send a response to the first service router indicating that the user is associated with the second geographical region. The response may contain routing information such as the DNS name or other network address of the chosen version of the service in the second geographical region.

In step 1007, if the determination is no, then the second service router may choose a version of the service in the first geographical region or in other geographical regions where the service is available. The second service router may maintain a service table which includes a list of references to the service in the other geographical regions that is available.

In step 1015, the second service router may send a response to the first service router, indicating the DNS name or other network address of the chosen version of the service in the geographical region where the service is available.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a first server of a plurality of servers and from a user device, a request for a service, wherein the first server is located in a first geographical region different from a second geographical region, and wherein a plurality of different versions of the service are implemented in one of the first geographical region or the second geographical region or in each of the first geographical region and the second geographical region;
   determining whether a user of the user device is associated with the first geographical region;
   responsive to determining that the user is not associated with the first geographical region, sending, by the first server and to a second server of the plurality of servers, a request to determine whether the user is associated with the second geographical region, wherein the second server is located in the second geographical region;
   receiving, by the first server and from the second server, a response indicating that the user is associated with the second geographical region, wherein the response comprises routing information for the request for the service, and wherein the routing information indicates a version of the service that is selected, by the second server, from the plurality of different versions of the service; and
   routing, by the first server, based on the routing information, and to the version of the service, the request for the service.

2. The method of claim 1, further comprising:
   receiving, by the first server and from the second server of the plurality of servers, a request to determine whether a second user is associated with the first geographical region; and
   responsive to determining that the second user is associated with the first geographical region, sending, to the second server of the plurality of servers, a second response indicating that the second user is associated with the first geographical region.

3. The method of claim 1, further comprising:
   receiving, from a second user device, a second request for the service;
   determining whether a second user of the second user device is associated with the first geographical region; and
   responsive to determining that the second user is associated with the first geographical region, determining a version of the service to send the second request.

4. The method of claim 1, further comprising:
   storing the routing information in a cache of the first server.

5. The method of claim 4, further comprising:
   receiving a second request for the service;
   determining whether the cache stores information configured to route the second request for the service; and
   responsive to determining that the cache stores the information configured to route the second request for the service, sending the second request for the service based on the information.

6. The method of claim 1, wherein a destination URL of the request for the service does not indicate the first geographical region or the second geographical region, and the receiving the request for the service comprises receiving the request for the service via a traffic manager.

7. The method of claim 1, wherein the determining whether the user is associated with the first geographical region comprises determining whether the user is allowed to send data to the first geographical region under data sovereignty laws.

8. The method of claim 1, wherein the routing information is configured to direct the request for the service to the version of the service in the first geographical region or in the second geographical region.

9. An apparatus comprising:
   a processor; and
   memory storing computer readable instructions that, when executed by the processor, cause the apparatus to:
      receive, from a user device, a request for a service, wherein the apparatus is located in a first geographical region different from a second geographical region, and wherein a plurality of different versions of the service are implemented in one of the first geographical region or the second geographical region or in each of the first geographical region and the second geographical region;

determine whether a user of the user device is associated with the first geographical region;

responsive to determining that the user is not associated with the first geographical region, send, to a second apparatus of a plurality of apparatuses, a request to determine whether the user is associated with the second geographical region, wherein the second apparatus is located in the second geographical region;

receive, from the second apparatus, a response indicating that the user is associated with the second geographical region, wherein the response comprises routing information for the request for the service, and wherein the routing information indicates a version of the service that is selected, by the second apparatus, from the plurality of different versions of the service; and route, based on the routing information and to the version of the service, the request for the service.

10. The apparatus of claim 9, wherein the computer readable instructions, when executed by the processor, further cause the apparatus to:

receive, from the second apparatus of the plurality of apparatuses, a request to determine whether a second user is associated with the first geographical region; and responsive to determining that the second user is associated with the first geographical region, send, to the second apparatus of the plurality of apparatuses, a second response indicating that the second user is associated with the first geographical region.

11. The apparatus of claim 9, wherein the computer readable instructions, when executed by the processor, further cause the apparatus to:

receive, from a second user device, a second request for the service;

determine whether a second user of the second user device is associated with the first geographical region; and responsive to determining that the second user is associated with the first geographical region, determine a version of the service to send the second request.

12. The apparatus of claim 9, wherein the computer readable instructions, when executed by the processor, further cause the apparatus to:

store the routing information in a cache of the apparatus.

13. The apparatus of claim 12, wherein the computer readable instructions, when executed by the processor, further cause the apparatus to:

receive a second request for the service;

determine whether the cache stores information configured to route the second request for the service; and responsive to determining that the cache stores the information configured to route the second request for the service, send the second request for the service based on the information.

14. The apparatus of claim 9, wherein a destination URL of the request for the service does not indicate the first geographical region or the second geographical region, and the receiving the request for the service comprises receiving the request for the service via a traffic manager.

15. The apparatus of claim 9, wherein the determining whether the user is associated with the first geographical region comprises determining whether the user is allowed to send data to the first geographical region under data sovereignty laws.

16. The apparatus of claim 9, wherein the routing information is configured to direct the request for the service to the version of the service in the first geographical region or in the second geographical region.

17. One or more non-transitory computer readable media storing computer readable instructions that, when executed, cause a first server to:

receive, from a user device, a request for a service, wherein the first server is located in a first geographical region different from a second geographical region, and wherein a plurality of different versions of the service are implemented in one of the first geographical region or the second geographical region or in each of the first geographical region and the second geographical region;

determine whether a user of the user device is associated with the first geographical region;

responsive to determining that the user is not associated with the first geographical region, send, to a second server of a plurality of servers, a request to determine whether the user is associated with the second geographical region, wherein the second server is located in the second geographical region;

receive, from the second server, a response indicating that the user is associated with the second geographical region, wherein the response comprises routing information for the request for the service, and wherein the routing information indicates a version of the service that is selected, by the second server, from the plurality of different versions of the service; and route, based on the routing information and to the version of the service, the request for the service.

18. The non-transitory computer readable media of claim 17, wherein the computer readable instructions, when executed, further cause the first server to:

receive, from the second server of the plurality of servers, a request to determine whether a second user is associated with the first geographical region; and responsive to determining that the second user is associated with the first geographical region, send, to the second server of the plurality of servers, a second response indicating that the second user is associated with the first geographical region.

19. The non-transitory computer readable media of claim 17, wherein the computer readable instructions, when executed, further cause the first server to:

receive, from a second user device, a second request for the service;

determine whether a second user of the second user device is associated with the first geographical region; and responsive to determining that the second user is associated with the first geographical region, determine a version of the service to send the second request.

20. The non-transitory computer readable media of claim 17, wherein the computer readable instructions, when executed, further cause the first server to:

store the routing information in a cache of the first server;

receive a second request for the service;

determine whether the cache stores information configured to route the second request for the service; and responsive to determining that the cache stores the information configured to route the second request for the service, send the second request for the service based on the information.

\* \* \* \* \*